(12) United States Patent
Tabb

(10) Patent No.: US 9,122,930 B2
(45) Date of Patent: Sep. 1, 2015

(54) AUTOMATED REMOTE CAR COUNTING

(71) Applicant: DigitalGlobe, Inc., Longmont, CO (US)

(72) Inventor: Mark Tabb, Estes Park, CO (US)

(73) Assignee: DigitalGlobe Inc., Longmont, CO (US)

( * ) Notice: Subject to any disclaimer, the term of this patent is extended or adjusted under 35 U.S.C. 154(b) by 78 days.

(21) Appl. No.: 14/095,637

(22) Filed: Dec. 3, 2013

(65) Prior Publication Data

US 2015/0016669 A1    Jan. 15, 2015

Related U.S. Application Data

(63) Continuation of application No. 13/942,544, filed on Jul. 15, 2013, now abandoned.

(51) Int. Cl.
*G06K 9/00* (2006.01)
(52) U.S. Cl.
CPC .................. *G06K 9/0063* (2013.01)
(58) Field of Classification Search
CPC ................................................... G06K 9/0063
USPC ....................................................... 382/103
See application file for complete search history.

(56) References Cited

U.S. PATENT DOCUMENTS

| | | | |
|---|---|---|---|
| 7,492,283 B1* | 2/2009 | Racunas, Jr. | 340/932.2 |
| 8,873,842 B2* | 10/2014 | Robinson et al. | 382/159 |
| 8,923,565 B1* | 12/2014 | Zhang et al. | 382/104 |
| 2013/0258107 A1* | 10/2013 | Delibaltov et al. | 348/148 |
| 2015/0086071 A1* | 3/2015 | Wu et al. | 382/103 |

* cited by examiner

*Primary Examiner* — Gregory F Cunningham
(74) *Attorney, Agent, or Firm* — Galvin Patent Law LLC; Brian R. Galvin

(57) ABSTRACT

A system for automated car counting comprises a satellite-based image collection subsystem; a data storage subsystem; and an analysis software module stored and operating on a computer coupled to the data storage subsystem. The satellite-based image collection subsystem collects images corresponding to a plurality of areas of interest and stores them in the data storage subsystem. The analysis module: (a) retrieves images corresponding to an area of interest from the data storage subsystem; (b) identifies a parking space in an image; (c) determines if there is a car located in the parking space; (d) determines a location, size, and angular direction of a car in a parking space; (e) determines an amount of overlap of a car with an adjacent parking space; (f) iterates steps (b)-(e) until no unprocessed parking spaces remain; and (g) iterates steps (a)-(f) until no unprocessed images corresponding to areas of interest remain.

2 Claims, 8 Drawing Sheets

AUTOMATED REMOTE CAR COUNTING

CROSS-REFERENCE TO RELATED APPLICATIONS

This application is a continuation of U.S. patent application Ser. No. 13/942,544, titled "AUTOMATED REMOTE CAR COUNTING", filed on Jul. 15, 2013, the entire specification of which is incorporated hereby by reference.

BACKGROUND OF THE INVENTION

1. Field of the Invention

The invention relates to the field of digital image processing, and more particularly to the field of analysis of remote sensing satellite and/or aerial image data.

2. Discussion of the State of Prior Art

In many cases, the number of generic cars (by which is meant any motor vehicle, car, SUV, pickup truck, etc., with 2 axles and 3 or more wheels) and the available designated parking slots, or spaces both observable by a remote sensing instrument on a satellite and/or aerial imaging system on an aircraft may need to be known or estimated by persons or entities other than those responsible for the facilities in question. For instance, it might be of value to know, on a time-sensitive basis, whether cars have been added or withdrawn from specific parking facilities. Obtaining such information typically is not possible on an ad hoc basis, either because the information is proprietary (private parking facilities, or public facilities with associated storage), or because it is released publicly on a fixed schedule (which is the case for public or municipal parking lots). Satellite imaging and other remote sensing capabilities make it possible to remotely observe such facilities independently of the facilities themselves (or of their owners and operators), as long as they are viewable from the remote sensing platform. Obviously, in the case of multi-storied parking facilities, only the upper-most level would be observable from overhead.

Given a source of remotely observed parking facilities such as short term and/or long term parking and/or storage lots, what is needed is a means for automatically estimating the number of cars parked and/or stored therein without the involvement of the operators or owners of those facilities. Additionally, the ratio of cars to parking slots (an occupancy ratio) may be of interest. In some cases, the variation in the number of cars parked and/or stored over specific time periods may be the end product.

SUMMARY OF THE INVENTION

Accordingly, the inventor has conceived and reduced to practice, in a preferred embodiment of the invention, various systems and methods for analysis of remotely sensed image data of parking facilities and/or car storage lots, for estimating the number of spaces or slots contained therein, and last, for estimating the number of cars parked and/or stored therein and monitoring them over time.

This Patent Application describes a system for automated or semi-automated estimation of the number of cars parked/stored in an assumed set of polygonal parking lots. Further, it can be assumed that the parking/storage lot is marked off with individual rows of parking slots or spaces. This data may be provided manually via training algorithms, through existing data sets such as OPENSTREETMAP™ or through an automated detection algorithms such as an automated parking lot/row detector.

The preferred embodiment of this invention creates a novel special-purpose analysis system from a mix of newly written algorithms in addition to making use of prior art analysis software with specially selected parameters and combined in non-obvious and novel ways. This analysis system is designed to automatically or semi-automatically analyze remotely sensed digital images, to locate parking spaces or slots, and to detect and count cars in those spaces or slots in parking/storage facilities (those that are visible from overhead).

According to an embodiment, the system may be implemented on, but not limited to, stand-alone high-end image-analysis workstations, or a cloud-based workstation with a web browser to interact with the various functions. Any implementation would always support a manual method where elements in an image are tagged for analysis by an automatic batch-oriented method, or an interactive semi-automatic method that refines an automated technique via machine learning.

According to a preferred embodiment of the invention, a system for automated car counting is disclosed, comprising a satellite-based image collection subsystem; a data storage subsystem; and an analysis software module stored and operating on a computer coupled to the data storage subsystem. The satellite-based image collection subsystem collects images corresponding to a plurality of areas of interest and stores them in the data storage subsystem. The analysis module: (a) retrieves images corresponding to an area of interest from the data storage subsystem; (b) identifies a parking space in an image; (c) determines if there is a car located in the parking space; (d) determines a location, size, and angular direction of a car in a parking space; (e) determines an amount of overlap of a car with an adjacent parking space; (f) iterates steps (b)-(e) until no unprocessed parking spaces remain; and (g) iterates steps (a)-(f) until no unprocessed images corresponding to areas of interest remain.

BRIEF DESCRIPTION OF THE DRAWING FIGURES

The accompanying drawings illustrate several embodiments of the invention, and together with the descriptions, serve to explain the principles of the invention according to embodiments. One skilled in the art will recognize that the particular embodiments illustrated in the drawings are merely exemplary, and are not intended to limit the scope of the present invention.

DETAILED DESCRIPTION OF EMBODIMENTS

Figure 1:
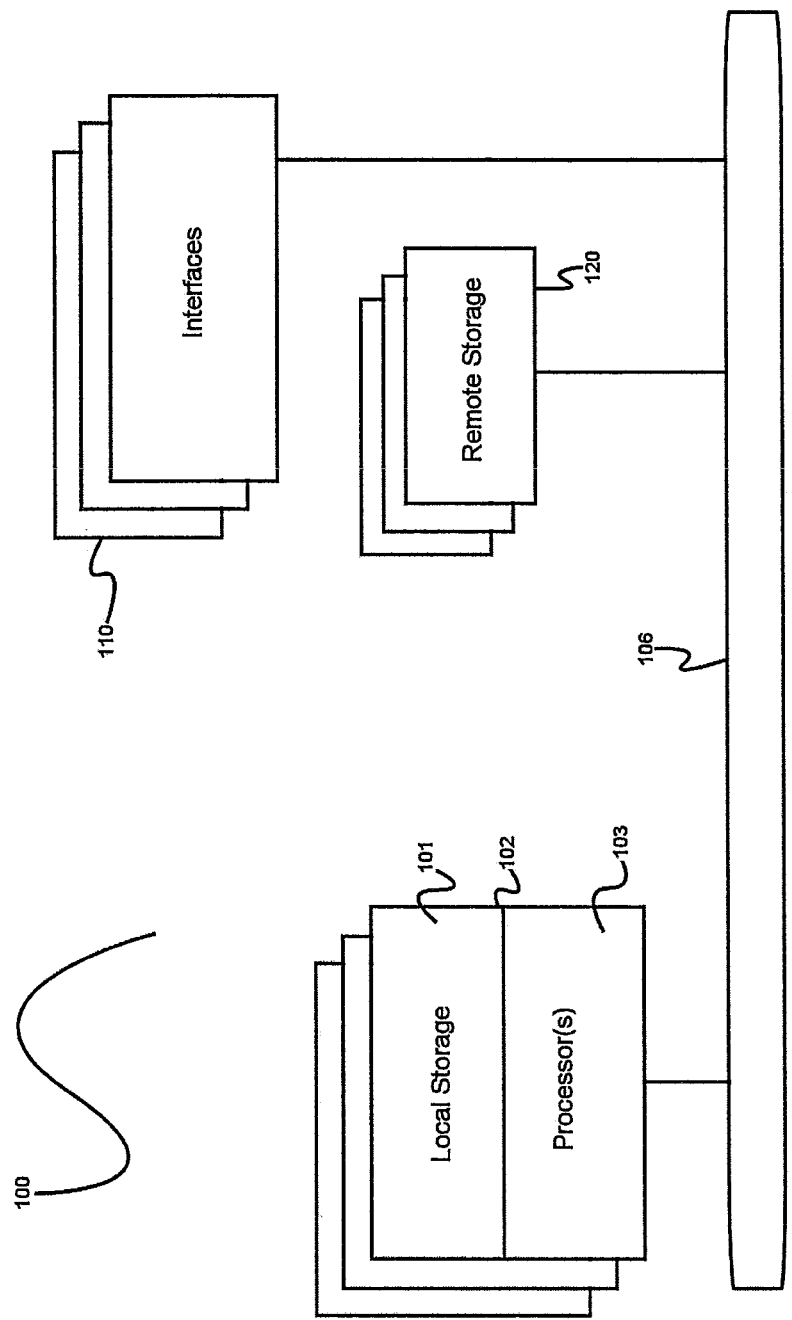
FIG. 1 is a block diagram illustrating an exemplary hardware architecture of a computing device.

The inventor has conceived, and reduced to practice, various systems and methods for automated or semi-automated estimation of the number of cars in parking and/or storage lots by analysis of digital image data from remote sensing instrumentation. Of interest is the ability to monitor vehicular traffic that may be very dynamic. The remote sensing instrument may be part of an orbital satellite payload, or part of a payload on an aircraft flying over areas of ground with car parking or storage lots visible from overhead.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations.

Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, analysis steps or the like may be described in a sequential order, such processes, methods and analysis steps may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step).

Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or analysis is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Figure 2:
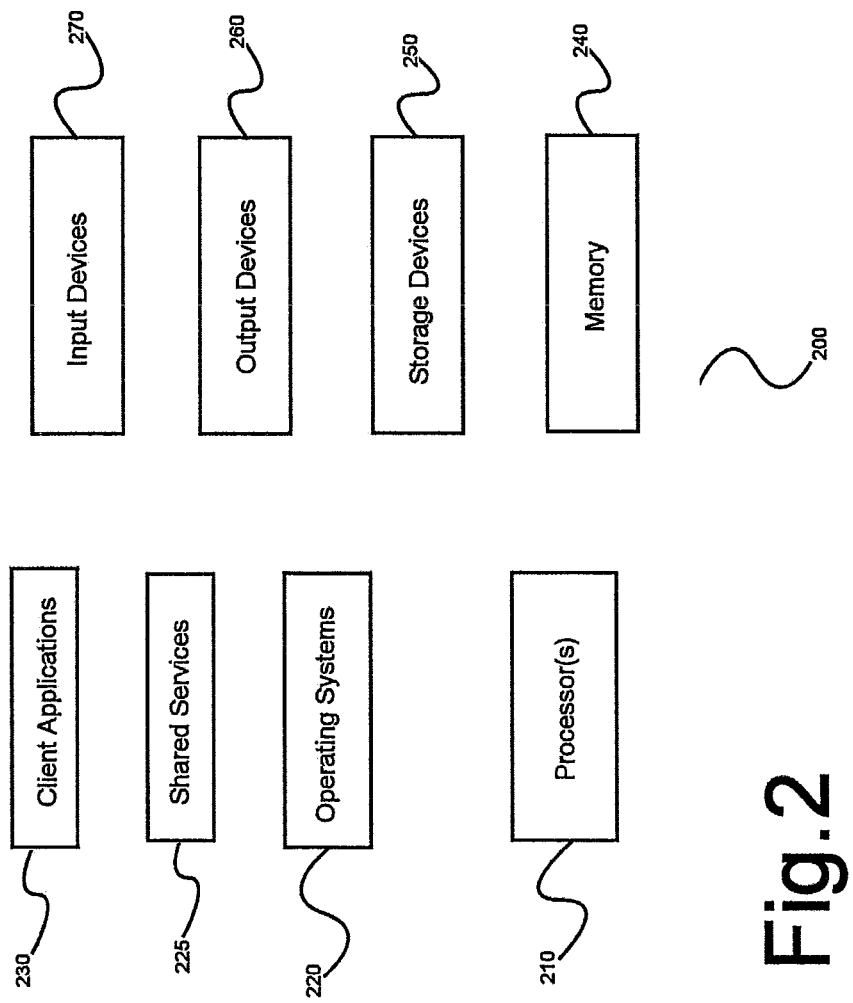
FIG. 2 is a block diagram illustrating an exemplary logical architecture for a client device, according to an embodiment of the invention.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card. Referring to FIG. 2, in order to allow interaction with the digital image data, a visual display system (e.g. output device 260), a means of generating a digital "cursor" that can be moved through the image and it's position read out, and a hand operated tracking/pointing device (e.g. input device 270 may be of any type suitable for receiving user input), including for example a keyboard, touchscreen, microphone (for example, for voice input), mouse, touchpad, trackball, or any combination thereof that can control the cursor's position, or via some other hardware-only approach known in the art.

Software/hardware hybrid implementations of at least some of an embodiments disclosed herein may be implemented on a programmable network-resident machine (which should be understood to include intermittently connected network-aware machines) selectively activated or reconfigured by a computer program stored in memory.

Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof.

In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate application software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100.

In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more embodiments of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of an embodiments described herein (or any combinations of the above).

Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein.

Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like.

Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, varieties of the Linux operating system, Google's Android™ operating system, or the like.

In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof.

Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
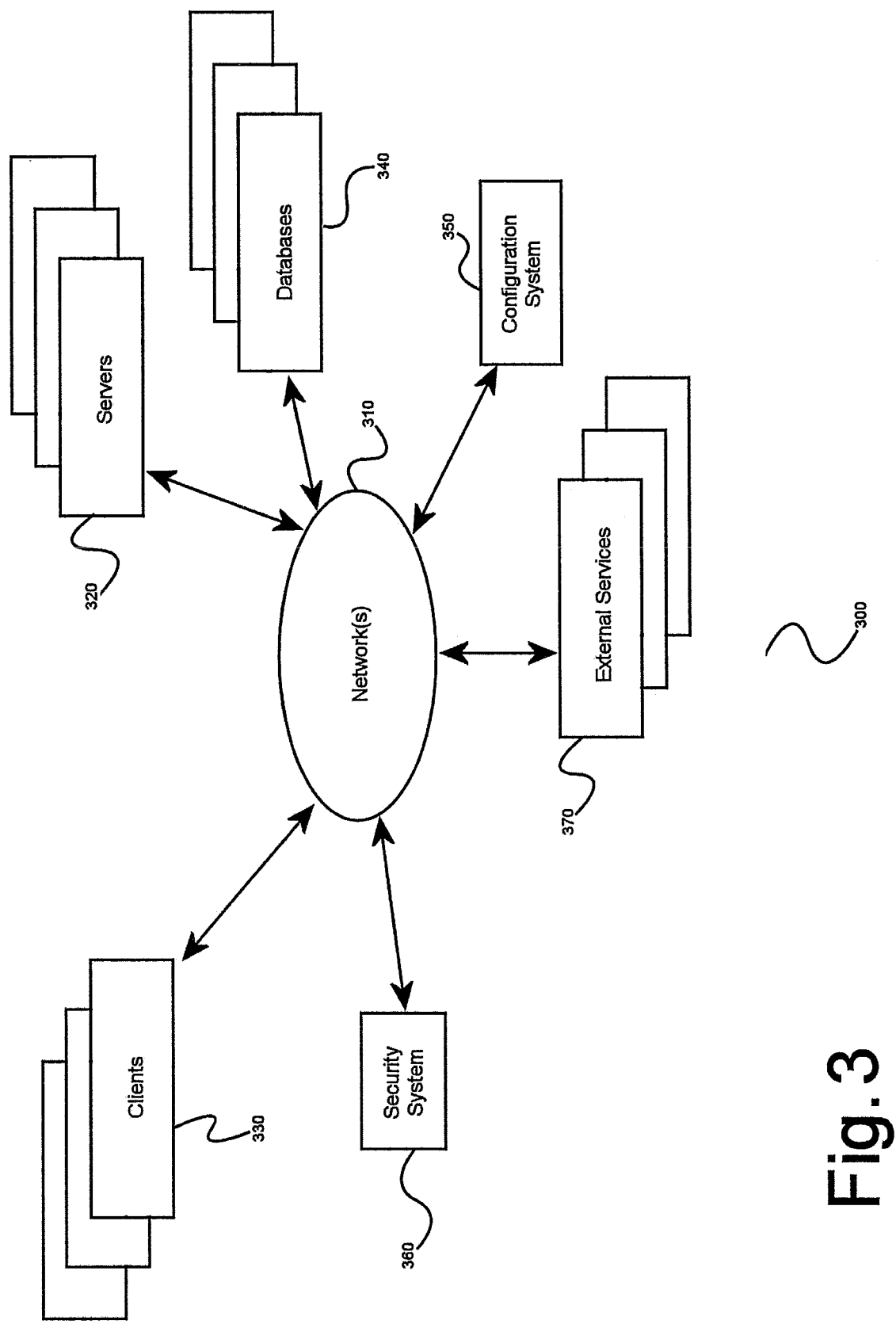
FIG. 3 is a block diagram illustrating an exemplary architectural arrangement of clients, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network.

According to an embodiment, any number of clients 330 may be accommodated. Each client 330 may run software for implementing client-side portions of the present invention; clients may comprise a system 200 such as that illustrated in FIG. 2. In addition, any number of servers 320 may be provided for handling requests received from one or more clients 330.

Clients 330 and servers 320 may communicate with one another via one or more electronic networks 310, which may be in various embodiments any of the Internet, a wide area network, a mobile telephony network, a wireless network (such as WiFi, Wimax™, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself.

For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention.

It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments, variant database architectures such as column-oriented databases, in-memory databases, clustered databases, distributed databases, or even flat file data repositories may be used according to the invention.

It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Overview

Figure 4:
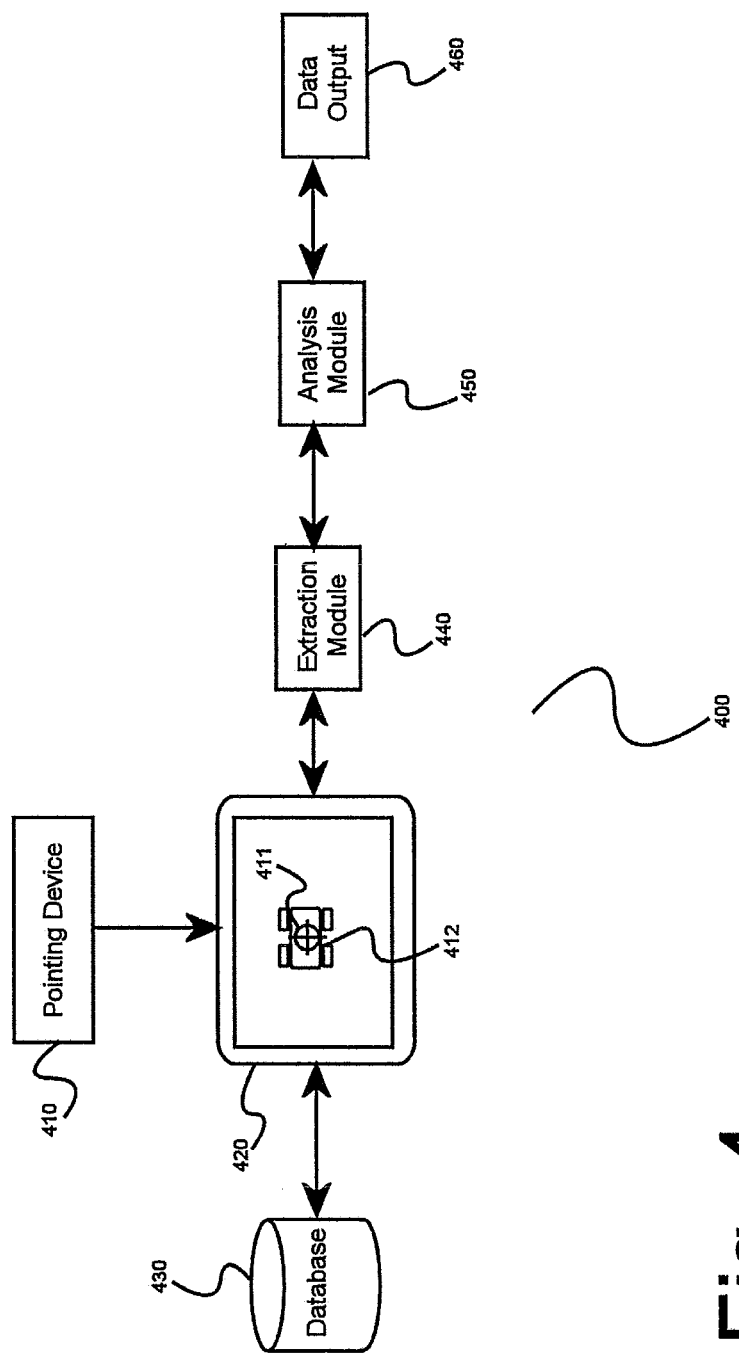
FIG. 4 is a block diagram providing a conceptual overview of a preferred embodiment of the invention, by which parking lot capacity and number of cars parked therein may be estimated.

According to an embodiment of the invention, FIG. 4 is a block diagram providing a conceptual overview of a system 400 for determining features or characteristics of cars in parking lots. As illustrated, various components of system 400 may be interconnected via a variety of means for communication, such as via a direct physical connection (such as via electronic cables or wired connections), or via a remote or cloud-based communication connection interchangeably. In such a manner, it will be appreciated that system 400 may be readily adaptable to a variety of configurations comprising varying arrangements of distributed or local components and arrangements, as described later (referring to FIG. 5).

According to an embodiment, a pointing device 410 may be used to position a cursor 411 to make an interactive selection of a car 412 displayed on a display device 420, which might be a computer monitor, electronic device with integral display such as a tablet or laptop computing device, or any similar video display device. Using such a display 420 with appropriate software components for interaction (as described below, referring to FIG. 5) it may be possible to determine initial location coordinates for a car 412. Then cursor 411 may be used to interactively determine initial values for a car, such as (for example) its orientation.

Alternatively, car dimensions may be loaded from an existing database 430 of known parking facility dimensions, which may either be acquired from parking facility operators or determined directly by a user of this invention and stored for future use. Furthermore, while most examples herein are made with reference to parked cars, it will be apparent to one having ordinary skill in the art that other types of vehicles may be used according to the invention. Also, most examples are made regarding car parking facilities, but it will be readily understood by one having ordinary skill in the art that car parking/storage is merely an exemplary use of the invention, and many other uses of the invention are envisioned by the inventor.

For example, aircraft at an airport, containerized storage on board a train, containers on a ship; dynamic movement of any of the above vs. time of any period over which you have remotely-obtained images, according to various embodiments of the invention.

According to an embodiment, extraction module 440 may extract image acquisition parameters and sun position from an image data header. Analysis module 450 may use those parameters together with the initial physical parameters for a car (orientation, and 3-D location) determined by application of an interactive cursor to determine the relative image rotation angle for a parking lot row (or, as mentioned above, loaded directly from an existing database of parking lot dimensions).

In the art, parameters may be extracted from the image data header for each digital image by extraction module 440, providing, for example, a time of observation, an orbital position of the satellite observing platform, and an orientation of the satellite observing platform (R=roll, P=pitch, & Y=yaw) with respect to an earth-centered coordinate system.

In the art, the ancillary data for each digital image may also provide image acquisition parameters in order that image distance measurements (in pixels) may be scaled to absolute linear measurements. Ancillary data for each digital image may also provide sun angle position data for the time corresponding to the center of the digital image, from which analysis module 450 calculates shadow direction, length, and shape for the digital images of the parking facility.

Initial estimates may be available for some car's location, and orientation. These initial estimates may be manually determined from other remote sensing sources such as aerial or satellite imagery, or extracted from the digital image through some other means, such as by use of a trackball controlled cursor, or they may be loaded directly from an existing data store.

According to the embodiment illustrated, output 460 from various components of system 400 may be produced and transmitted via a connection (which may be of varied nature as described above), such as for further use or analysis or storage in a database 420 as described above.

It should be appreciated that such output data may have varied content and be utilized in a variety of means according to the invention, and that the arrangement illustrated is exemplary in nature and additional or alternate components may be utilized according to the invention, such as for further utilization of output data 460.

According to an embodiment of the invention, the analysis system has 5 major steps:

1. INITALIZATION: of parking lot image data and raster Car_Likelihood_Prior. The data input system consists of an image header extraction function, an image display function, a software cursor generator function controlled by means of a trackball (or digital mouse or other interactive pointing device) whose coordinates in the displayed image can be read back into a processing function,
2. REGISTRATION: Given a pair of images for registration, a tiepoint algorithm may be used on a given patch in a pair of images in a temporal sequence. This will generate point correspondences (with potentially many outliers) between the two images $$(x1,y1)i <-> (x2,y2)i.$$

3. CHANGE DETECTION: Extraction of the Car_Temporal_Change function seeks to answer, "Has there been a change between the two images?"
4. CAR DETECTION: Update raster values of Car_Likelihood_Prior which signify the likelihood of a car/parking space existing at each pixel $[x\ y\ d]_n$ in the input digital image, and at a particular orientation. Eight orientations may be used (from 0° to 180°, each separated by 22.5°). The likelihoods may take values on the unit interval [0.0, 1.0]
5. POST DETECTION OPTIMIZATION: Each car detection, provides a location and orientation. A detector window may be applied over every pixel in each patch.

Many of these detections will overlap one another, therefore a separate optimization, using a Markov_Random_Field (MRF), on an arbitrary 2-D surface, removes the overlaps. The surface has multiple nodes where each node is a car detection with spatial neighbors. The "Data_Cost" is the "cost of assigning a label to a particular node." A "Neighbor_Cost" is the "cost of assigning two labels over a neighboring pair of nodes". The MRF optimization is to find the optimal labeling on the whole surface which minimizes the sum of all "Data_Costs" and the sum of all "Neighbor_Costs".

The following functions and/or algorithms require specific implementation and parameter selection:

ParkingLot/RowDetection algorithm (Being developed under a separate Patent Application)

raster Car_Likelihood_Prior function (Novel & unique data storage and flags)

Car_Orientation function (Novel & unique s/w)

Car_Temporal_Change function (Novel & unique s/w)

Patch_Based_Epipolar_Geometry_Processing function (Novel & unique s/w)

RANSAC (RANdom SAmple Consensus) algorithm for an iterative, non-deterministic fitting function especially good at separating inliers from outliers . . . (Prior Art s/w)

Sampson_Distance function (Prior Art s/w)

Semiglobal Optimization algorithm (Prior Art s/w)

Normalized Cross_Correlation function (Prior Art s/w)

Census_Transform_Cost function (Prior Art s/w)

Total_Variation_Optimization algorithm (Prior Art s/w)

Split_Bregman algorithm (Prior Art s/w)

Differential_Morphological_Profile (DMP) algorithm (Prior Art s/w)

Tiepoint_Solution function (Prior Art s/w)

Top_Hat function (Prior Art s/w)

data output (Novel & unique s/w)

data storage/archiving function (Novel & unique s/w)

executive function to manage the overall process (Novel & unique s/w)

According to a preferred embodiment of the invention, accurate registration (down to the sub-pixel level) of temporal images is required for car detection and counting. Accurate multi-image registration of the same ground area is required for multiple purposes such as:

Propagation/updating of the Raster Car_Likelihood_Prior function from image to image.

Extraction of the Car_Temporal_Change function.

Accounting for irregular temporal sampling intervals.

Ability to accommodate a large range of data acquisition parameters (i.e., satellite look angles and solar illumination geometry).

Ability to resolve the epipolar lines to sub-pixel accuracy.

In addition, this embodiment of the invention may make use of either pre-(Level 1B, 2A) or post-(Level 3A, 3D) Ortho-rectified image data:

Level 1B Images in sensor coordinates,

Level 2A Images projected onto an ellipsoid, i.e. height=0,

Level 3A Images projected onto low res Digital Elevation Map (DEM, 100-200 m),

Level 3D Images projected onto higher res Digital Elevation Map (DEM, 30-90 m).

An embodiment of the invention assumes that initial estimates are available for a small subset of car 2-D locations and orientations [xi yi di]$_n$ along with viewing geometry, and solar illumination geometry for a set of images of the same ground region or patch. Typically these patches are 1000-4000 pixels in extent, corresponding to approximately 2 km by 2 km with resolution of 0.5 m-1.0 m.

According to an embodiment of the invention, a tiepoint algorithm may be used on a given patch in a pair of images in a temporal sequence. This will generate point correspondences (with potentially many outliers) between the two images (x1, y1)i<->(x2,y2)i.

According to a preferred embodiment of the invention, when a new image arrives in a temporal monitoring process, it is registered (using registration techniques such as those described herein) and compared with the previous image. According to an embodiment of the invention, it may be shown that the image patches will not register over the entire patch region because of a combination of errors in the remote sensing instrument data acquisition parameters (e.g., sensor orientation, un-modeled atmospheric refraction), and errors in the Digital Elevation Model (DEM).

The former can be modeled with a Fundamental Matrix (F-matrix) that applies to the patch. The F-matrix is a 3×3 matrix, with # equal to the number of independent parameters, varying depending on type of remote sensing instrument used. For a calibrated frame camera #=5 parameters, for an uncalibrated frame camera #=7. For this case, we have #=4 parameters. It may be shown by the embodiment of the invention that the remaining height error for any point lies on a line (hyperbola for a pushbroom type instrument). For a tie-point (x1,y1)<->(x2,y2), given an F-matrix, where (x1,y1) in image #1, must have a match in image #2 which lies on an epipolar line in image space given by the F-matrix. The same relationship may be shown for (x2,y2).

Given a point (x1,y1) in image 1, the Sampson_Distance is the Euclidean distance in image space from a candidate match (x2,y2) in image 2 and the epipolar line for (x1,y1) in image 1. To improve the optimization fitting, a RANSAC process may be used to determine the F-matrix and the set of tiepoints (inliers) for whom the Sampson_Distance may be <1 pixel. Note that one need not solve for the 3D location of each and every tie-point.

Another possible method would be to make use of a "bundle adjustment" where a nonlinear optimization may be implemented that simultaneously solves for the acquisition parameters and 3D location of all tiepoints. However, it may be shown that this nonlinear process requires extremely good initialization and may be very sensitive to outliers: this is not the case for the RANSAC process.

Lastly the Sampson_Distance may be calculated by:

$$SD = Sqrt[\{(a^*x1)+(b^*y1)+(c^*x2)+(d^*y2)+e\}/sqrt\{(a^*a)+(b^*b)+(c^*c)+(d^*d)\}]$$

According to a preferred embodiment of the invention, once the F-matrix has been determined, the sensor acquisition uncertainty may be estimated, and the images may be re-sampled so that the topographic (elevation) error is entirely represented by a shift in one dimension, typically along the remote sensing instrument x-axis.

An optimization is then done to compute the shift (disparity) at each pixel using the SemiGlobal optimization process which implements either a Normalized_Cross_Correlation or a Census_Transform_Cost function. This SemiGlobal optimization, instead of implementing a full 3-D optimization over the set of all pixels in the patch, does at each pixel, an independent optimization on azimuth lines in the imagery in eight different directions (from 0° to 180° indexed by 22.5°), summing the resulting disparity likelihoods. The optimal disparity likelihood is then selected at each pixel location.

Because the SemiGlobal optimization is not fully 3-D, it introduces artifacts that require an additional compensating optimization step, called a Total_Variation optimization with an L1 normalization (TV-L1). This optimization step favors piecewise constant disparity regions with abrupt discontinuities and may be solved using the Split_Bregman technique.

According to a preferred embodiment of the invention, when a new image arrives in a temporal monitoring process, it is registered (using registration techniques such as those described herein in ¶¶[095]-[112]) and compared with the previous image. A "change detection feature" is then computed. Instead of using a pixel-based change detection method, which tends to not be robust, the embodiment implements a structural method known in the art as Differential Morphological Profiles (DMP). DMP can be used to identify bright or dark areas of a particular size in an image.

Such an approach can be shown to be invariant to radiometric offsets from the remote sensing system. DMP consists of applying opening and closing spatial filter kernels with reconstruction to an image, and then subtracting the result from the original image. This process is known in the art as applying a Tophat function. According to a preferred embodiment of the invention, the process first identifies in both images all bright and dark objects that would be removed by a 6 m×6 m wide kernel. Regions having contrast with their surround (as determined with the Tophat operator) greater than some Threshold will be retained. Each pixel is then labeled as (bright, dark, or background). At each pixel, a change is said to have occurred if the two images have differing labels, and the absolute radiometric difference between the original image values is greater than the same DMP Threshold.

According to a preferred embodiment of the invention, an update is then performed to the raster Car_Likelihood_Prior, which increases the likelihood uniformly over all directions at each pixel where a change has occurred. In addition, a change mask is created for the new image representing three cases (1=bright object in image and change occurred, 2=dark object in image and change occurred, 3=other). This change mask is then fed into the car detection step as a "feature image".

According to an embodiment of the invention, in the art for a given satellite or aerial image acquisition, there may be uncertainty in both the instrument mounting location on the satellite and the instrument angular orientation with respect to the satellite R,P,Y vectors. The measurement of these locations and angles is referred to in the art as Metrology. In the art, for either a framing camera or a push broom sensor, the metrological errors may be modeled by a 3-D positional offset and a 3-angle relative rotation. In the art for satellite remote sensing, if one assumes a near circular orbit, the positional errors as described by a set of three linear offsets (which may be found by a data extraction module 440), typically may be ignored. As a result, in the art, aligning a particular satellite image to an absolute coordinate system may be described with a 1×3 set of three rotational parameters.

In the art, with a satellite remote sensing instrument observing a ground patch, imaging may be considered approximately Affine, which can be mathematically expressed by a four parameter Fundamental Matrix. In the art, furthermore, an Affine imaging system, such as a remote sensing system, may be described by a linear approximation, such as a 1st order Taylor series. The accuracy of the approximation may be found to be inversely proportional to the size of the ground patch over which it is applied.

According to an embodiment of the invention, image tiepoints may be selected from two images of the same ground patch in a temporal sequence, and used in a RANSAC process to compute the optimal Fundamental Matrix for the patch. Any common tiepoint approach may be used; e.g. normalized cross correlation, or SIFT (Scale-Invariant Feature Transform) descriptors, etc.

According to an embodiment of the invention, in the art, a 2-D image tiepoint may be represented in homogeneous coordinates as [x y 1] T. Given this expression in the art, then the epipolar constraint may be: $x1T*F*x2=0$, where F may be the 3×3 Fundamental Matrix, and x1, x2, are the corresponding 2-D image tiepoints in two separate, but overlapping image patches.

Furthermore in the art, T is a vector transpose, so a 2-D point (x, y) in a patch is written as a 3-element vector [x y 1] T. In the art, the expression Homogeneous means that the last parameter is a normalization factor such as $(u,v)=(x/z, y/z)$ =[x y z] T=[x/z y/z 1] T. As embodied in the invention, the expression in the art for a Fundamental Matrix may describe an Affine imaging system: $F=[0\ 0\ a;\ 0\ 0\ b;\ c\ d\ e]$, which may be found to require five parameters, along with an arbitrary scale factor. According to an embodiment of the invention, with the F-matrix now evaluated, the sensor acquisition uncertainty may become known. In an embodiment of the invention, this process may be extended with additional tiepoint sets, within the patch, which will provide a better estimation for the scale factor and decrease the sensor acquisition uncertainty.

For an embodiment of the invention, as expressed in the art, given an F-matrix, then the image may be resampled and a rectifying Homography may then computed for each image from the F-matrix, ..., $x1Rectified=H1*x1$, $x2Rectified=H2*x2$ for all pixels x1, y2 in their respective images. As expressed in the art, H1 and H2 are 3×3 matrices (homographies) also determined from the F-matrix. For an embodiment of the invention, this expression of the art may be found to distribute the matching uncertainty, due to the height error from the DEM, entirely along the x-axis.

For an embodiment of the invention, now solve for the 1-D shift (disparity) at each pixel. Semibglobal is a standard technique in the art for solving this type of optimization. Parameters may be selected so that Semiglobal will compute 1-D optimizations over 8 azimuth directions in the image (each separated by 22.5°). In this expression of the art, each direction may produce a likelihood of occurance for each disparity at a pixel. These likelihoods may be aggregated, or summed, and the most likely (i.e., optimal) one may be selected.

According to an embodiment of the invention, for each parking/storage facility, estimates of the orientation, and 3-D location for each possible parking space or slot may need to be tracked over time. These parameters are assumed to be unchanging over time, but as more information (i.e. contained in a time-ordered series of digital images) becomes available, these parameters may be re-estimated by methods performed by extraction module 440, thus improving the accuracy in parking space location. Finally, the number of cars in the parking/storage facility may be estimated from each digital image, and monitored over a period of time by analysis of additional time-ordered series of digital images.

Relative Rotation Estimation

According to an embodiment of the invention, estimating the three relative rotation parameters can be accomplished using any number of modern computer vision and/or photogrammetry techniques. In the art, one such embodiment may be to determine image tiepoints (correspondences) in a time-ordered series of digital images, and then perform a "bundle adjustment", to align the images with respect to one another. Such a relative alignment also yields improved alignment with a global coordinate system, as the pointing errors for multiple images may have large uncorrelated components across different orbits. In the art, tiepoint approaches such as those using interest points and descriptors (SURF, SIFT, etc.) may be used, as well as normalized_cross_correlation of image patches.

Initialization of Parking Lot and Raster Car_Likelihood_Prior

In the embodiment of the invention, raster Car_Likelihood_Prior, signifies the likelihood of a car/parking space existing at each pixel at a particular orientation. Eight orientations are used, separated by 22.5°. The likelihoods take values on the unit interval [0.0, 1.0]. The embodiment assumes polygonal areas of interest are given, e.g. a set of parking lots. In addition, individual rows with car orientation may optionally be given. This data can be provided manually, through existing data sets such as OPENSTREETMAP™, or through automated detection algorithms such as ParkingLot/RowDetection.

Registration

For the embodiment of this invention, accurate sub-pixel level registration of time-ordered images may be required for this application in several respects: propagation/updating of the Car_Likelihood_Prior from image-to-image, and extraction of temporal Change_Detection features. Registration requires two things: resolving the uncertainty in the satellite acquisition parameters and correcting the local DEM (Digital Elevation Model) error.

An embodiment of the invention begins the Registration process by running a tiepoint algorithm which provides point correspondences (with potentially many outliers) between two images:

$$(x1i, y1i) <-> (x2i, y2i)$$

The former may be accomplished using bundle adjustment, however for the embodiment of the invention an approach may be used which focuses solely on resolving epipolar lines. The major advantages of doing this are to realize a substantial increase in computational speed (~1000× faster than bundle adjustment), and to realize major improvements in the accuracy of the epipolar geometry.

Prior art bundle adjustment software may not guarantee sub-pixel accuracy in results, due to unresolved atmospheric parameters over the full aperture of the remote sensing instrument, Chief among these being atmospheric refractivity, and velocity aberration at optical and near IR wavelengths. Instead one of the key embodiments of this invention is to work over sub-regions of the remote sensing data frame referred to ground patches (~2 km×~2 km) over which we it is possible to resolve the epipolar lines to sub-pixel accuracy.

Attempting to apply the embodiments of this invention over an entire image will show that the images do not register because of a combination of errors in data acquisition parameters, such as lack of accuracy in knowledge of the sensor position and orientation on the spacecraft, lack of accuracy in the pointing of the spacecraft, lack of accuracy in modeled atmospheric refraction and potential height errors in the Digital Elevation Model. (DEM).

Errors in knowledge of metrology, may be modeled with a Fundamental-Matrix applied separately to each ground patch. The Sampson distance, in the art, can be computed directly from a Fundamental Matrix. For a satellite sensor observing a ground patch, the imaging can be considered to be approximately Affine, resulting in a four parameter Fundamental Matrix. In the art, given a point $(x1,y1)$, the Sampson distance is the Euclidean distance in image space from a candidate tiepoint match $(x2,y2)$ and the epipolar line for $(x1,y1)$. RANSAC in the art may be used to determine the F-matrix and the set of tiepoints (inliers) whose Sampson distance may be <1 pixel. Note that one need not solve for the 3D location of all tiepoints, which is a major time saver.

Image tiepoints are used in the RANSAC process to compute the optimal Fundamental Matrix for a patch. Any common tiepoint approach may be used (Normalized Cross Correlation, SIFT Descriptors, etc.). Representing a 2-D image point in homogeneous coordinates as [x y 1]T, the epipolar constraint is: x1T*F*x2=0, where F is the 3×3 Fundamental Matrix, and x1, x2, are the corresponding 2-D image points from two separate images. For Affine imaging, F=[0 0 a; 0 0 b; c d e], which is five parameters, along with an arbitrary scale factor.

T is a vector transpose, so a 2-D point (x, y) in an image is written as a 3-vector [x y 1] T Homogeneous means that the last parameter is a normalization factor, i.e., $$(u,v)=(x/z,y/z)=[x\ y\ z]T=[x/z\ y/z\ 1]T$$

For F, using Matlab™ notation, which is in the art, and referring to the Sampson distance described above, inspection may show that it is invariant to the method by which parameters (a,b,c,d,e) may be scaled. Thus, there are only 4 independent parameters, selected to scale such that:

$$a*a+b*b+c*c+d*d=1$$

In the art, the Epipolar constraint is therefore: x1*T*F*x2=0, from which one can derive the Sampson distance.

In the art, one may compare a RANSAC optimization process to Bundle Adjustment where you do a nonlinear optimization that simultaneously solves for the acquisition parameters and 3D locations of all tiepoints. This Bundle Adjustment process requires very good initialization and may be sensitive to outliers, which may not be so for a RANSAC optimization.

Once the F-matrix may be estimated, the sensor acquisition uncertainty may be known, and the remote sensing data can be re-sampled so that any topographic error may be entirely represented by a shift in one dimension, typically the x-axis.

An optimization may then be done to compute the shift (disparity) at each pixel. This can be done using any standard Photogrammetric stereo approach. For the embodiment of this invention, Semiglobal optimization with either a Normalized_Cross_Correlation or a Census_Transform_Cost function may be used. This optimization technique instead of doing a full 2-D optimization over the set of all pixels, does independent 1-D optimizations on lines in the imagery along eight different azimuth directions, summing the resulting disparity likelihoods. The optimal Disparity_Likelihood may then be selected at each pixel.

For an initial disparity d at each pixel (from Semiglobal), the final disparity f may be computed. A joint optimization over all pixels may be done as:

$$Sum[|di-fi|+lambda*|grad\ fi|]$$

The Total_Variation is the L1_Norm of the spatial 2-D gradient of:

$$f: |grad\ f|=sqrt((fi,j-fi-1,j)^2+(fi,j-fi,j-1)^2)$$

|d−f| says the output disparities should be similar to the input, but outliers can occur (L1 Norm allows this, whereas L2 does not). The Total_Variation favors disparities that are locally (piecewise) constant or slowly varying, but again, the L1_Norm allows for abrupt spatial discontinuities (buildings, trees, etc.) Note that d,f can be vector valued at each pixel. For example one can fuse N images together at once, where N>=2.

Once the F-matrix is known, the images are resampled: a rectifying Homography is computed for each image from the F-matrix, ie x1Rectified=H1*x1, x2Rectified=H2*x2 for all pixels x1, y2 in their respective images.

.H1 and H2 are 3×3 matrices (homographies) determined from the F-matrix. This puts the matching uncertainty from the height error entirely along the x-axis. The 1-D shift (disparity) at each pixel may be evaluated.

The Census_Transform_Cost function is also in the art. In this embodiment of the invention, for a scalar remote sensing data set, and a window of dimensions w, h around a pixel, form a vector of length w*h−1, for a w*h window, where each element has 3 possible values:

{1, if $x-x0>T$; 0, if $|x-x0|<=T$, −1, if $x-x0<-T$}

Where x0 is the center pixel value, x is the value of a pixel in the window but not at the center, and T is a threshold.

Because this optimization may not be fully 2-D, it has artifacts in it. These artifacts may be compensated for by a second optimization, which involves a Total_Variation optimization from the art with an L1 Norm also in the art (TV-L1). This optimization favors piecewise constant disparity regions with abrupt discontinuities. The optimization may be solved using the Split-Bregman technique.

Change Detection

TV_L1 and Split-Bregman, are standard techniques, well known in the prior art, but usually used in isolation. It is the inventor's belief that this may be the first time they have been used together, along with Semiglobal, for this type of image lattice analysis.

When a new image arrives in a temporal monitoring process, it may be registered and compared with the previous image. A Change_Detection feature may then be computed. For the embodiment of this invention, instead of a pixel-based change approach, which tends to not be very robust, a structural method based on Differential_Morphological_Profiles (DMP) was implemented. DMP may identify bright or dark areas in an image of a particular size. Such an approach may be invariant to Radiometric Offsets (but may be susceptible to Radiometric Gain changes).

DMP_opening($N$)=original image−size $N$ morphological opening by Reconstruction DMP_closing($N$)=original image−size $N$ morphological closing by Reconstruction In the art, for a structuring element of size N (circle diameter or square length), one applies an N×N filter to the image patch and subtracts that output from the original image to detect structures of size N.

DMP_opening(N) gives bright areas, and DMP_closing (N) gives dark areas. Reconstruction may be a Connected_Component_Operator, so if a region has any portion larger than the structuring element of size=N, then the entire region is kept—including all of its fine scale boundary detail.

DMP consists of applying opening and closing kernels with reconstruction to an image, and then subtracting the result from the original image (Top_Hat). For the embodiment of this invention, one first identifies in both images all bright and dark objects that will be removed by a 6 m wide square filter kernel. Regions having contrast with their surround (determined with the Top_Hat operator) greater than a threshold parameter will be retained.

The DMP threshold parameter may be learned by interactive processing and not changed. In terms of normalization, images can either be calibrated to surface reflectance, or a histogram normalization may be applied to the individual images, which gives them the same histogram distribution (standard image processing). Non-retained pixels are given a value (0) that the learning can key off of. The histogram normalization curve may be: Brightest 1% of pixels mapped to top 10% of output range, the same for the darkest 1%, and the middle 98% of pixels will be linearly mapped to the middle 80% of the output range.

Each pixel may then be labeled as (Bright, Dark, Background). At each pixel, a change may then be said to have occurred, if the two images have differing labels, and the Absolute Radiometric Difference between the original image data values may be greater than the same DMP threshold. An update may then be performed to the raster Car_Likelihood_Prior, which increases the likelihood uniformly over all directions at each pixel where a change occurred. In addition, a change mask may be created for the new image representing three cases {bright object in image with change occurring, dark object in image with change occurring, other}. This change mask may then be fed into the detection step as a feature image.

Car Detection

The Car Detection is done using a boosted cascade of features. AdaBoost, in the art, may be used. Each stage consists of a boosted set of one-dimensional features. False alarms are reduced by a factor of 0.99 at each stage, with four stages being used. Ground truth data is created off-line and used in supervised training. The image is rotated through a set of eight uniformly spaced angles (22.5°), and the detection applied independently to each rotated image. Rotating an image may be fast and easily multithreaded. The images may be resampled with a reasonable bilinear kernel, which minimizes aliasing artifacts. The addition of a small amount of spatial smoothing typically improves detection rates.

Features are standard machine-learning-terminology. They are the inputs to the classifier. The embodiment of this invention boosts up a set of weak 1-D classifiers into a strong classifier. The embodiment may learn from 100,000 features. Only a single feature may be used by an individual weak classifier. For the embodiment of this invention features are coded and loaded into a window surrounding each pixel. A 15×7 window is used, although this is an implementation detail. The window needs to be larger than 1 car, but not too large. The window long axis may be parallel with the long dimension of the car. The window may be in meters (7.5 m×3.5 m) converted to pixels depending on image resolution. Interactive training with modest changes to window size will yield different classifiers, but nearly identical detection rates. The set of features available are:

Haar features derived from the panchromatic image
summation windows on the temporal change image
summation windows on the DMP for the image (identifies small bright and dark regions)
raster Car_Likelihood_Prior at the current orientation An embodiment of the invention allows for Supervised Learning by creating a training set of "positives" (cars with known locations and direction) and "negatives" (locations with no cars). This proof test set allows the user to test out parameter sets for AdaBoost and other algorithm constants which may maximize the detection rate.

In addition, separate detectors may be trained for 8 different sun azimuth offsets with respect to the car orientation. The appropriate detector is selected for the current orientation. Features (b-d) allow the false alarms to be reduced dramatically from one detector stage to the next (0.99 instead of a more typical 0.5).

Post Detection Optimization

Each detection, provides a location and orientation, and also an expectation as to the approximate size of the vehicle: if length/width ratio ~=2-2.5 m, then width ~=2-2.5 m. Cars have a typical size range. Since the resolution of the remote sensing imagery is known (0.5 to 1.0 meters/pixel), the inverse gives 2.0 to 1.0 pixels/meter. Rotations of the data do not change resolution.

The detector window is applied over every pixel in each patch. All features from the pixels in the window are considered by the detector. However, many of these detections will overlap one another spatially. As a result, a separate optimization to estimate the most likely set of physically realizable detections will require a multi-dimensional binary ("to keep" or "not to keep" for each detection) of 2^N complexity, for N detections. The optimization is formulated as a Markov_Random_Field (MRF), which can be represented by Data_Costs at each detection as well as Neighbor_Costs for each neighbor on an arbitrary 2-D surface.

This surface has nodes, where each node is a car detection. The surface may be embedded in a 2-D plane. Each node has spatial neighbors. Each node may be assigned a [0 1] label that indicates a valid detection, or not. The "data cost" is the "cost of assigning a label to a particular node" (ignoring all other nodes). A "neighbor cost" is the "cost of assigning the two labels over a neighboring pair of nodes". The optimization is to find the optimal labeling on the whole surface which minimizes the sum of all "data costs" and "neighbor costs".

For a given detection, all other detections within a certain radius are considered neighbors. This radius is large enough to include overlapping detections as well as the immediately adjacent spaces in a row of parked cars. The Data_Cost may be given by the Car_Likelihood_Prior for detection at that pixel and orientation. For the Neighbor_Cost with overlapping detections, the cost of detecting both may be set to infinity (overlapping detections: 2 cars cannot occupy the same physical space, it is not physically realizable), whereas all other label combinations are set to a learned cost, c (all parameters may be determined by supervised learning). All nodes are detections.

What makes any one detection more likely than another may be the Car_Likelihood_Prior. For a detection, the direction and the typical size and/or shape of a car are known, so it may be possible to determine if they are overlapping. All parameters may be determined by supervised learning. For non-overlapping neighbors, the cost is also c, unless the neighbor is a candidate for being an adjacent car in the parking row, in which case the cost may be 0, if both are detected and the orientations are identical, or c/2 if they differ by no more than +/−45°, and c otherwise. 'Adjacent car candidate' is defined as a neighbor whose detection-center offset-vector from the current detection is =>45° from the detected orientation (+/−180°).

The MRF optimization is 'non-submodular', thereby preventing Max_Flow optimizations from being used. MRF optimizations can be divided into submodular and 'non-submodular', with the former easily solved with graph cut techniques, such as Max_Flow. Non-submodular is much harder to deal with. A positive detection is typically defined as any detection window which intersects any part of the object, and a false alarm when there may be no intersection. Thus, one may have 3 detections/object and still have 100% detection and no false alarms. For counting this is undesirable.

The MRF optimization step provides a unique, novel, and original solution not found elsewhere in the art. Parking Lots often have cars packed-in very tightly, so we get excessive numbers of overlapping detections with different directions, etc. The MRF optimization resolves this in an 'optimal' way. Any appropriate non-sub-modular optimization may be utilized at this point, including Quadratic_Pseudo_BOolean (QPBO), Tree_Re_Weighting (TRW-S), Loopy_Belief_Propagation (LBP), Sequential_Greedy_Selection (SGS), etc.

Typically, around ⅔ of the detections are removed by this process. Finally, the optimized detections are used to update the Car_Likelihood_Prior. Updates are done using a cost_function with learned parameters:

$$P \to alpha*P+(1-alpha)*lambda$$

Where P is the probability at a given pixel and orientation, alpha a parameter, and lambda a 3-valued indicator {0=no detection, 1=detection, ½=detection at that pixel, but direction differs by +/−45°}.

DETAILED DESCRIPTION OF EXEMPLARY EMBODIMENTS

In the art, parameters may be extracted from the image data header for each digital image by extraction module 440, providing, for example, a time of observation, an orbital position of the satellite observing platform, and an orientation of the satellite observing platform (R=roll, P=pitch, & Y=yaw) with respect to an earth-centered coordinate system.

In the art, ancillary data from each digital image data header may provide image acquisition parameters so that image distance measurements (in pixels) may be scaled to absolute linear measurements. In the art, ancillary data from each digital image data header may also provide sun angle position data for the time corresponding to the center of the digital image, from which analysis module 450 calculates shadow direction, length, and shape for the digital images.

In the art, initial estimates are available for each car's location and orientation. These initial estimates may be manually determined from other remote sensing sources such as aerial or satellite imagery, or extracted from the digital image through some other means, such as by use of a track-ball controlled cursor 410.

According to an embodiment of the invention, an analysis module 450 incrementally refines the initial estimates for each car to be located, using information extracted from a time-ordered series of remote sensing digital images of parking lots. This set of image data may be assumed to include parking lots of interest, with irregular time sampling intervals and a large range of image acquisition parameters.

Figure 5:
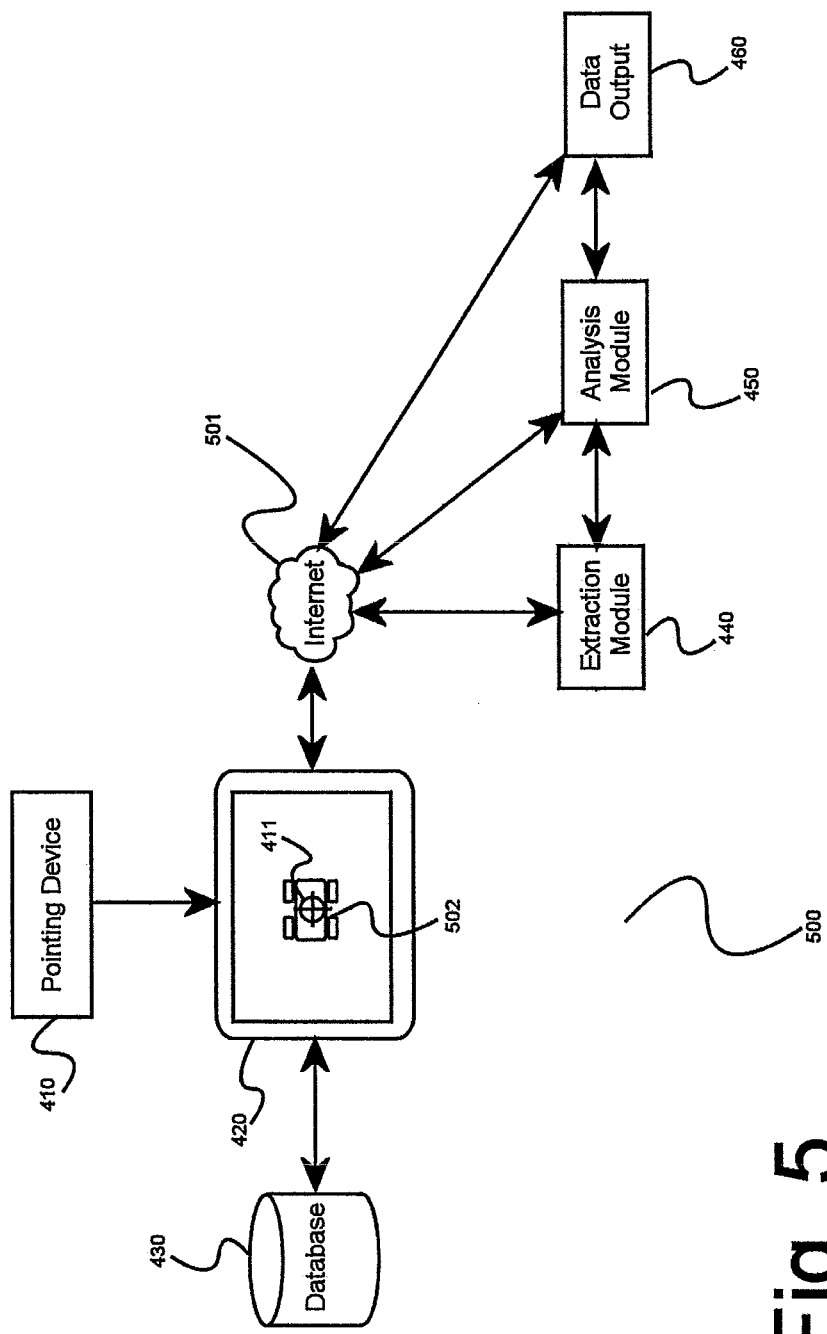
FIG. 5 is a block diagram of a system for estimating parking lot capacity and number of cars parked therein using a cloud-based service, according to a preferred embodiment of the invention.

According to an embodiment of the invention, FIG. 5 is a system architecture diagram of an alternate image analysis system 500 with data and analysis modules residing in one or more cloud systems. These cloud systems may be addressable on a browser through the Internet 501 or another communications network to data and analysis modules previously loaded into one or more cloud-based systems (i.e., remotely operated and accessible via a network as previously described).

According to an embodiment, a cursor 411 may be used to make an interactive selection of a parked car 502 and determine initial location coordinates and orientation for a car image 502. Then the cursor may be used to interactively determine initial values for the car length to width ratio. According to an embodiment, extraction module 440 in the cloud extracts the image acquisition parameters and sun position angular data from the image data header. An analysis module 450 uses those parameters together with the initial physical parameters for a car (length to width ratio, and 2-D location) determined by application of an interactive cursor to determine the relative image rotation angle for a given car image.

According to an embodiment of the invention, an analysis module 450 in the cloud incrementally refines the initial estimates for each car to be located and whose orientation will be determined using information extracted from a time-ordered series of digital images of the parking lots loaded into the cloud. A time-ordered series of imagery may be assumed to include parking lots of interest, with irregular time sampling intervals and a large range of image acquisition parameters. In the art, parameters may be extracted from the image data header for each digital image by data extraction module 440, providing, for example, a time of observation, an orbital position of the satellite observing platform, and an orientation of the satellite observing platform (R=roll, P=pitch, & Y=yaw) with respect to an earth-centered coordinate system.

In the art, the ancillary data for each digital image may also provide image acquisition parameters in order that image distance measurements (in pixels) may be scaled to absolute linear measurements. Ancillary data for each digital image may also provide sun angle data for the time corresponding to the center of the digital image, from which analysis module 450 calculates shadow direction, and shape for the digital images of the parking lots.

In the art, initial estimates may be available for parking lot location, parking space orientation, and parking space width. These initial estimates may be provided manually, through existing data sets such as OPENSTREETMAP™, or through automated detection algorithms such as ParkingLot/RowDetection. In the art, Ground truth data is created off-line and used in supervised learning or training. In the art one creates a training set of positives (cars with known locations/directions) and negatives (no cars). Then by using these test images, one may learn all the parameters (for Boosting and other algorithm parameters) that maximize both the change_detection rate and the car_detection rate.

According to an embodiment of the invention, an analysis module 450 incrementally refines the initial estimates for each parking lot space to be measured, using information extracted by extraction module 440 from a time-ordered series of digital images of the parking lot. A time-ordered series of imagery may be assumed to include parking lot spaces of interest, with irregular time sampling intervals and a large range of image acquisition parameters.

Figure 6:
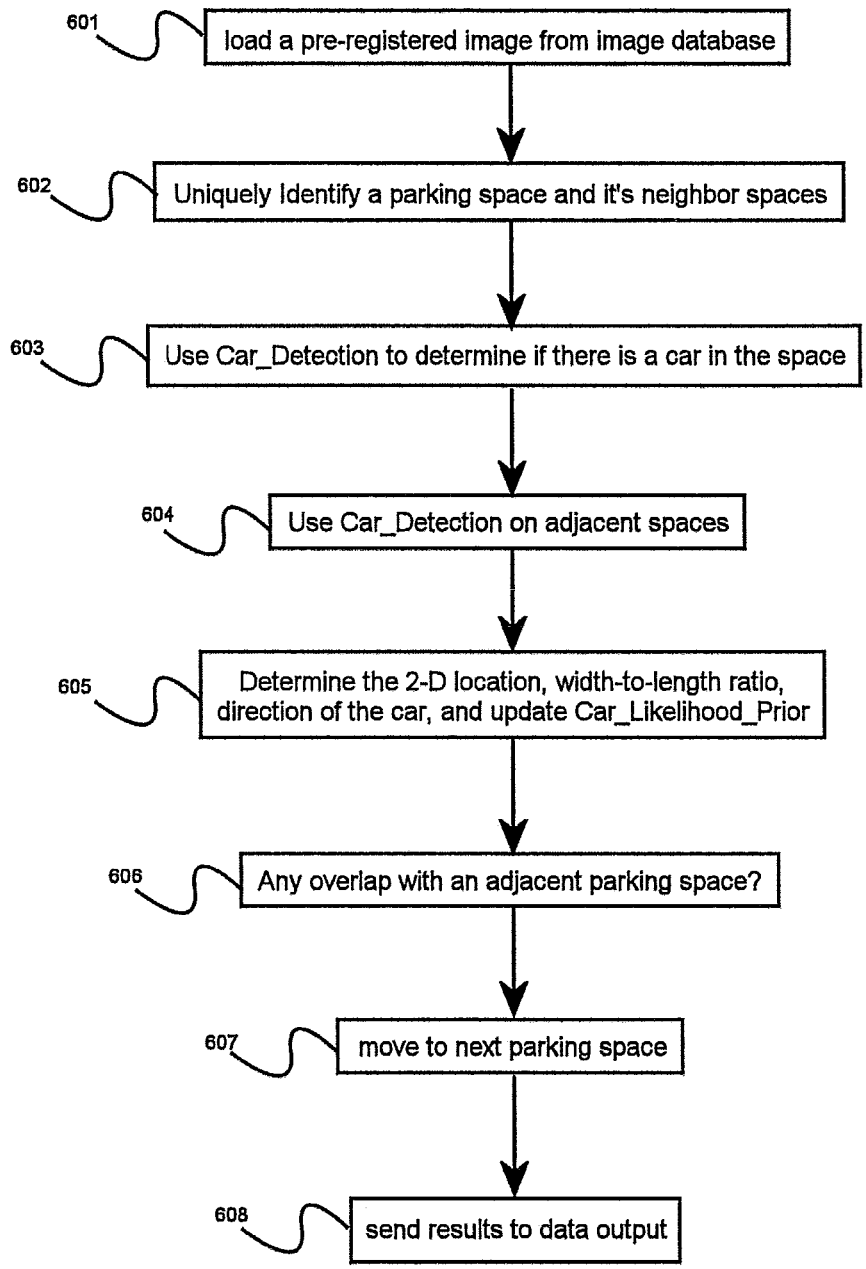
FIG. 6 is a process flow diagram of a method for estimating parking lot capacity and number of cars parked therein using semi-automated analysis, according to a preferred embodiment of the invention.

According to an embodiment of the invention, system 600 (or system 500, as the basic process steps used in system 600 are analogous to those in system 500) may be nested in a semi-automatic process. FIG. 6 is a method diagram illustrating an exemplary method 600 for locating and analyzing parking spaces within an image, according to an embodiment of the invention. The method assumes that a sufficient number of tiepoints in a sufficient number of patches in a pair of images have been located and the Registration process carried out prior to step 601.

Next, in step 602, individual parking spaces in a parking lot in the first image are located. Then the process determines for each parking space all parameters needed to uniquely identify the space and its neighbor spaces.

In step 603 the process uses Car_Detection to determine if a car may be parked in the space, and in step 604 if the adjacent spaces empty or full.

In a next step 605, the process determines the 2-D location, width-to-length ratio, orientation and updates Car_Likelihood_Prior.

In a next step 606, a car's characteristics may be used to determine if there is overlap with an adjacent parking space. If there is overlap, it may be flagged in CarLikelihood_Prior.

The process continues with step 607 moving along rows locating additional parking spaces, and if they have cars in them or not. Additional images in the sequence are loaded and analyzed until the process is concluded by user input, or a processing flag is generated, halting the process for user input.

If no cars remain in the image area, in a final step 607 processed data may be produced as output to be viewed or further processed or stored.

In the art, initial estimates may be available for parking lot location, parking space orientation, and parking space width. These initial estimates may be provided manually, through existing data sets such as OPENSTREETMAP™, or through automated detection algorithms such as parking lot/row detection. In an embodiment of the invention, raster Car_Likelihood_Prior, signifies the likelihood of a car/parking space existing at each pixel at a particular orientation. Eight orientations are used, separated by 22.5°. The likelihoods take values on the unit interval [0.0, 1.0]. The embodiment assumes polygonal areas of interest are given, e.g. a set of parking spaces. In addition, individual rows with car orientation may optionally be given.

Figure 7:
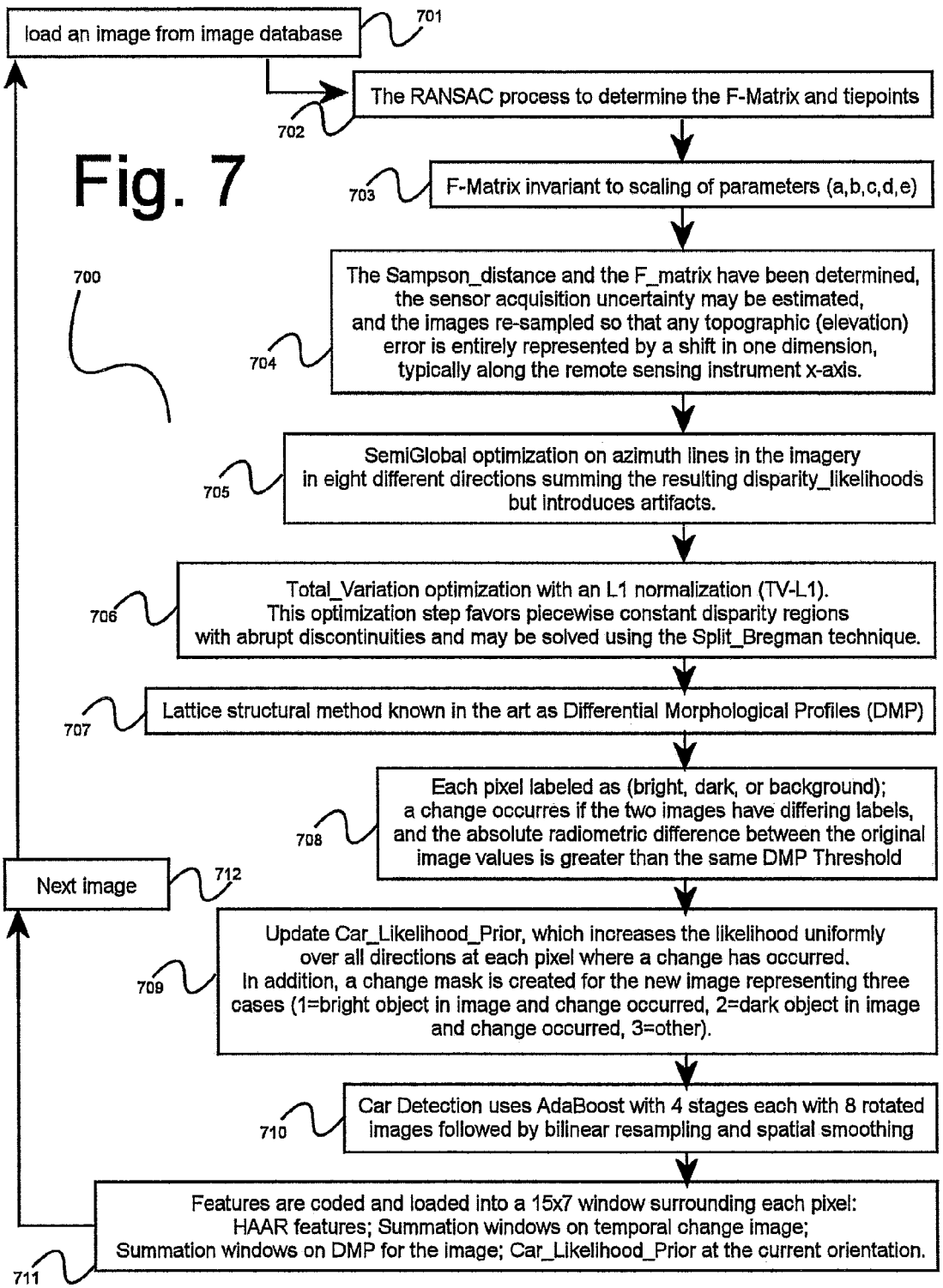
FIG. 7 is a process flow diagram of a further method for estimating parking lot capacity and number of cars parked therein using semi-automated analysis, according to an embodiment of the invention.

According to an embodiment of the invention, FIG. 7 is a method diagram illustrating an exemplary method 700 for locating and analyzing parking spaces within an image and then determining if the spaces are occupied by cars.

In an initial step 701, image data in a time ordered sequence may be received for analysis. An embodiment of the invention begins the Registration process by running a tiepoint algorithm which provides point correspondences (with potentially many outliers) between two images:

$(x1i, y1i) <-> (x2i, y2i)$

For a satellite sensor observing a ground patch, the remote sensing system can be considered to be approximately Affine, resulting in a four parameter Fundamental_Matrix. In the art, given a point (x1,y1), the Sampson distance is the Euclidean distance in image space from a candidate tiepoint match (x2,y2) to the epipolar line for (x1,y1). In step 702 the RANSAC process, in the art, may be used to determine the F-matrix and the set of tiepoints (inliers) for whom the Sampson_distance may be <1 pixel.

Image tiepoints are used in the RANSAC process to compute the optimal Fundamental_Matrix, (in the art), for a patch. Any common tiepoint approach may be used (Normalized Cross Correlation, SIFT Descriptors, etc.). Representing a 2-D image point in homogeneous coordinates as [x y 1]T, the epipolar constraint is: x1T*F*x2=0, where F is the 3×3 Fundamental Matrix, and x1, x2, are the corresponding 2-D image points from two separate images. For Affine imaging, F=[0 0 a; 0 0 b; c d e], which is five parameters, along with an arbitrary scale factor.

T is a vector transpose, so a 2-D point (x, y) in an image is written as a 3-vector [x y 1] T Homogeneous means that the last parameter is a normalization factor, ie., $(u,v) = (x/z, y/z) = [x\ y\ z]T = [x/z\ y/z\ 1]T$ In step 703, for F, using Matlab™ notation, which is in the art, and referring to the Sampson_distance described above, which is also in the art, inspection shows that it is invariant to the method by which parameters (a,b,c,d,e) may be scaled. Thus, there are only 4 independent parameters, selected so as to scale such that:

$a*a + b*b + c*c + d*d = 1$

In the art, the Epipolar constraint is therefore: x1*T*F*x2=0, from which one can derive the Sampson_distance for the patch as:

$$SD = \text{sqrt}[\{(a*x1)+(b*y1)+(c*x2)+(d*y2)+e\}/\text{sqrt}\{(a*a)+(b*b)+(c*c)+(d*d)\}]$$

In step 704, according to a preferred embodiment of the invention, once the Sampson_distance and the F_matrix have been determined, the sensor acquisition uncertainty may be estimated, and the images may be re-sampled so that any topographic (elevation) error is entirely represented by a shift in one dimension, typically along the remote sensing instrument x-axis.

In step 705, an optimization is first done to compute the shift (disparity) at each pixel using the SemiGlobal optimization process which makes use of either a Normalized_Cross_Correlation or a Census_Transform_Cost function. This SemiGlobal optimization, instead of implementing a full 3-D optimization over the set of all pixels in the patch, does at each pixel, an independent optimization on azimuth lines in the imagery in eight different directions (from 0° to 180°, indexed by 22.5°), summing the resulting disparity_likelihoods. The optimal disparity_likelihood is then selected at each pixel location.

Because the SemiGlobal optimization is not fully 3-D, it introduces artifacts that require an additional compensating optimization step 706, called a Total_Variation optimization with an L1 normalization (TV-L1). This optimization step favors piecewise constant disparity regions with abrupt discontinuities and may be solved using the Split_Bregman technique According to a preferred embodiment of the invention, when a new image arrives in a temporal monitoring process, it is registered (using registration techniques such as those disclosed herein) and compared with the previous image. A "change detection feature" is then computed. Instead of using a pixel-based change detection method, which tends to produce a large amount of noise, the embodiment implements, in step 707, a lattice structural method known in the art as Differential Morphological Profiles (DMP). DMP can be used to identify bright or dark areas of a particular size in an image.

DMP consists of applying opening and closing spatial filter kernels with reconstruction to an image, and then subtracting the result from the original image. This process is known in the art as applying a Tophat function. According to a preferred embodiment of the invention, the process first identifies in both images all bright and dark objects that would be removed by a 6 m×6 m wide kernel. Regions having contrast with their surround (as determined with the Tophat operator) greater than some Threshold will be retained. In step 708, each pixel is then labeled as (bright, dark, or background). At each pixel, a change is said to have occurred if the two images have differing labels, and the absolute radiometric difference between the original image values is greater than the same DMP Threshold.

According to a preferred embodiment of the invention, in step 709 an update is then performed to the raster Car_Likelihood_Prior, which increases the likelihood uniformly over all directions at each pixel where a change has occurred. In addition, a change mask is created for the new image representing three cases (1=bright object in image and change occurred, 2=dark object in image and change occurred, 3=other). This change mask is then fed into the Car Detection step as a "feature image".

In the embodiment of the invention, the Car Detection may be done in step 710 using a boosted cascade of features.

AdaBoost, in the art, may be used. Each stage consists of a boosted set of one-dimensional features. False alarms are reduced by a factor of 0.99 at each stage, with four stages being used. The image is rotated through a set of eight uniformly spaced angles (22.5°) from 0° to 180°, and the detection applied independently to each rotated image. The images may be resampled with a reasonable bilinear kernel, which minimizes aliasing artifacts. The addition of a small amount of spatial smoothing typically improves detection rates.

Figure 8:
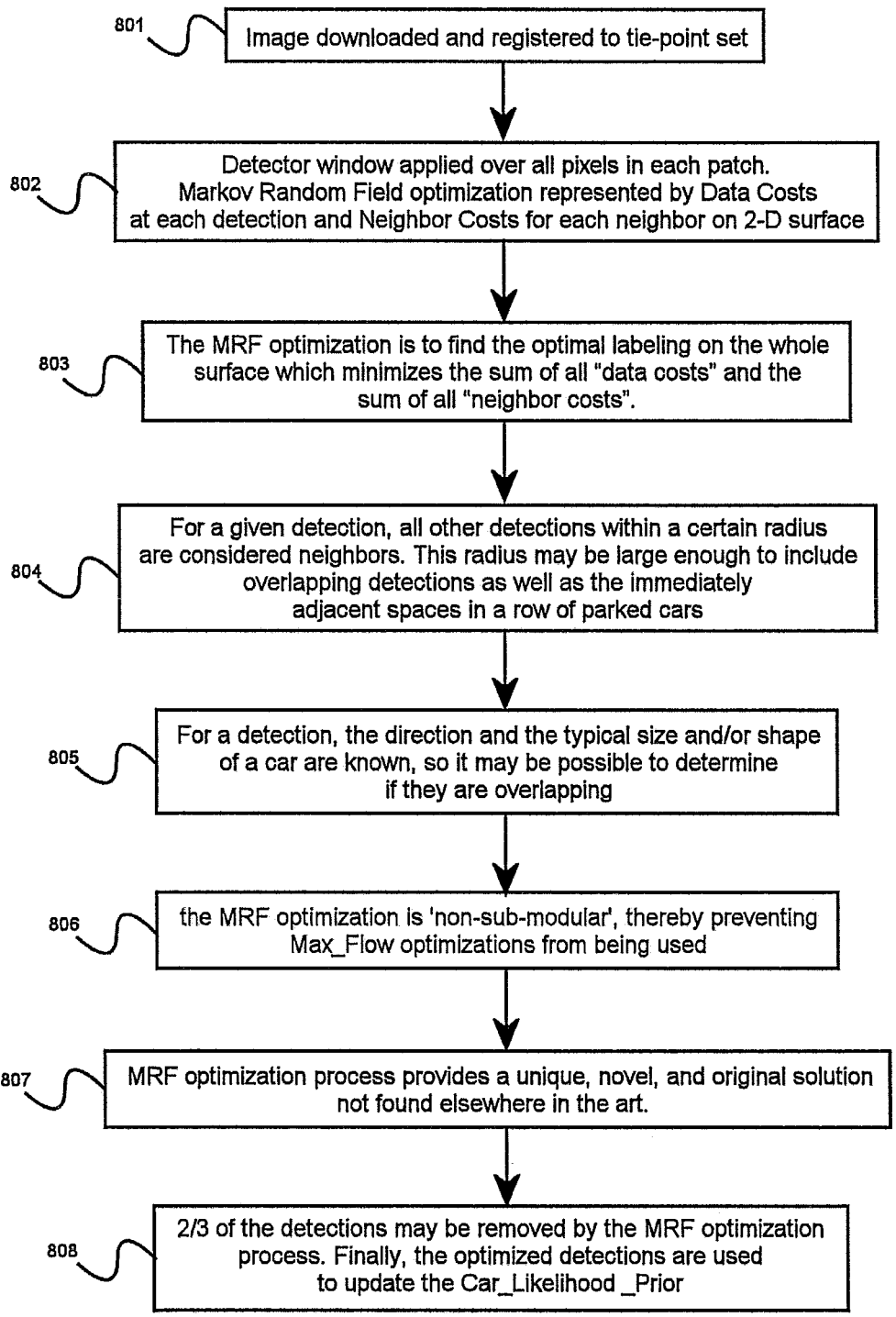
FIG. 8 is a process flow diagram of a further method for Post Detection Optimization of parking lot capacity and number of cars parked therein using semi-automated analysis, according to an embodiment of the invention.

In step 711, for the embodiment of this invention, features are coded and loaded into a window surrounding each pixel. A 15×7 window is used. The window needs to be larger than 1 car, but not too large. The window long axis should parallel the long dimension of the car. The set of features available are:
  Haar features
  summation windows on the temporal change image
  summation windows on the DMP for the image (identifies small bright and dark regions)
  raster Car_Likelihood_Prior at the current orientation According to an embodiment of the invention, FIG. 8 is a method diagram illustrating an exemplary method 800 for Post Detection Optimization of cars in parking spaces within a remote sensed image. The method assumes that in step 801 an image has been down loaded and undergone tie-point registration.

In step 802, in an embodiment of the invention, the detector window is applied over every pixel in each patch. All features from the pixels in the window are considered by the detector. However, many of these detections will overlap one another spatially. As a result, a separate optimization to estimate the most likely set of physically realizable detections will require a multi-dimensional binary ("to keep" or "not to keep" for each detection) of 2^N complexity, for N detections. The optimization is formulated as a Markov_Random_Field (MRF), which can be represented by Data_Costs at each detection as well as Neighbor_Costs for each neighbor on an arbitrary 2-D surface.

In a next step 803, in the embodiment of the invention, this surface has nodes, where each node is a car detection. Each node has spatial neighbors. Each node may be assigned a [0 1] label that indicates a valid detection, or not. The "data cost" is the "cost of assigning a label to a particular node" (ignoring all other nodes). A "neighbor cost" is the "cost of assigning the two labels over a neighboring pair of nodes". The MRF optimization is to find the optimal labeling on the whole surface which minimizes the sum of all "data costs" and the sum of all "neighbor costs".

In step 804, in the embodiment of the invention, for a given detection, all other detections within a certain radius are considered neighbors. This radius may be large enough to include overlapping detections as well as the immediately adjacent spaces in a row of parked cars. The Data_Cost may be given by the Car_Likelihood_Prior for detection at that pixel and orientation. For the Neighbor_Cost with overlapping detections, the cost of detecting both may be set to infinity (for overlapping detections: 2 cars cannot occupy the same physical space, it is not physically realizable), whereas all other label combinations are set to a learned cost, c (all parameters may be determined by supervised learning). All nodes are detections.

In step 805, in the embodiment of the invention, what makes any one detection more likely than another may be the Car_Likelihood_Prior. For a detection, the direction and the typical size and/or shape of a car are known, so it may be possible to determine if they are overlapping. All parameters may be determined by supervised learning. For non-overlapping neighbors, the cost is also c, unless the neighbor is a candidate for being an adjacent car in the parking row, in which case the cost may be 0, if both are detected and the orientations are identical, or c/2 if they differ by no more than +/−45°, and c otherwise. 'Adjacent car candidate' is defined as a neighbor whose detection-center offset-vector from the current detection is =>45° from the detected orientation (+/−180°).

In a next step 806, in the embodiment of the invention, the MRF optimization is 'non-sub-modular', thereby preventing Max_Flow optimizations from being used. MRF optimizations can be divided into sub-modular and 'non-sub-modular', with the former easily solved with graph cut techniques, such as Max_Flow. A non-sub-modular condition may be much harder to deal with. A positive detection is typically defined as any detection window which intersects any part of the object, and a false alarm when there may be no intersection. Thus, one may have 3 detections/object and still have 100% detection and no false alarms. For counting this is undesirable.

In a next step 807, in the embodiment of the invention, the MRF optimization process provides a unique, novel, and original solution not found elsewhere in the art. Parking Lots often have cars packed-in very tightly, so there may be excessive numbers of overlapping detections with different directions, etc. The MRF optimization resolves this in an 'optimal' way. Any appropriate non-sub-modular optimization may be utilized at this point, including Quadratic_Pseudo_BOolean (QPBO), Tree_Re_Weighting (TRW-S), Loopy_Belief Propagation (LBP), Sequential_Greedy_Selection (SGS), etc.

In the next step 808, in the embodiment of the invention, around ⅔ of the detections may be removed by the MRF optimization process. Finally, the optimized detections are used to update the Car_Likelihood_Prior. Updates are done using a cost_function with learned parameters:

$$P \to alpha*P+(1-alpha)*lambda$$

Where P is the probability at a given pixel and orientation, alpha a parameter, and lambda a 3-valued indicator {0=no detection, 1=detection, ½=detection at that pixel, but direction differs by +/−45°}.

The skilled person will be aware of a range of possible modifications of the various embodiments described above. Accordingly, the present invention is defined by the claims and their equivalents.

What is claimed is:

1. A system for automated remote car counting, the system comprising:
   a satellite-based image collection subsystem;
   a data storage subsystem comprising a database of images obtained from the satellite-based image collection subsystem; and
   an analysis software module stored and operating on computer coupled to the data storage subsystem;
   wherein the satellite-based image collection subsystem collects a plurality of images corresponding to a plurality areas of interest and stores them in the data storage subsystem; and
   wherein the analysis module carries out the following steps to compute the number of cars in an area of interest:
   (a) retrieving an image corresponding to an area of interest from the data storage subsystem;
   (b) identifying a parking space in the image;
   (c) determining if there is a car located in the parking space;
   (d) determining location, size, and angular direction of a car in a parking space;
   (e) determining an amount of overlap of a car with an adjacent parking space;
   (f) iterating steps (b)-(e) until no unprocessed parking spaces remain; and
   (g) iterating steps (a)-(f) until no unprocessed images corresponding to areas of interest remain.

2. A method of automatically counting cars, the method comprising the steps of:
   (a) retrieving, using a satellite-based image collection subsystem, a plurality of images and storing them in a data storage subsystem;
   (b) retrieving, using an analysis software module stored and operating on computer coupled to the data storage subsystem, an image corresponding to an area of interest from the data storage subsystem;
   (c) identifying, using the analysis software module, a parking space in the image;
   (d) determining if there is a car located in the parking space;
   (e) determining a location, size, and angular direction of a car in a parking space;
   (f) determining an amount of overlap of a car with an adjacent parking space;
   (g) iterating steps (b)-(e) until no unprocessed parking spaces remain; and
   (h) iterating steps (a)-(f) until no unprocessed images corresponding to areas of interest remain.

* * * * *